(12) United States Patent
Isaji

(10) Patent No.: US 6,664,919 B2
(45) Date of Patent: Dec. 16, 2003

(54) RADAR DEVICE

(75) Inventor: Osamu Isaji, Kobe (JP)

(73) Assignee: Fujitsu Ten Limited (JP)

( * ) Notice: Subject to any disclaimer, the term of this patent is extended or adjusted under 35 U.S.C. 154(b) by 0 days.

(21) Appl. No.: 10/313,149

(22) Filed: Dec. 6, 2002

(65) Prior Publication Data

US 2003/0117313 A1 Jun. 26, 2003

(30) Foreign Application Priority Data

Dec. 10, 2001 (JP) ........................................ 2001-375892

(51) Int. Cl.[7] ................................................ G01S 13/93
(52) U.S. Cl. ...................... 342/109; 342/70; 342/128; 342/130; 342/145
(58) Field of Search ............................ 342/70, 71, 72, 342/85, 109, 118, 128, 130, 145, 192, 194, 189

(56) References Cited

U.S. PATENT DOCUMENTS

| | | | | |
|---|---|---|---|---|
| 5,274,380 A | * | 12/1993 | Yatsuka et al. ............... | 342/70 |
| 5,973,636 A | * | 10/1999 | Okubo et al. ................. | 342/70 |
| 6,040,796 A | * | 3/2000 | Matsugatani et al. ......... | 342/70 |
| 6,097,331 A | * | 8/2000 | Matsugatani et al. ......... | 342/70 |

\* cited by examiner

*Primary Examiner*—Ian J. Lobo
(74) *Attorney, Agent, or Firm*—Fogg and Associates, LLC

(57) ABSTRACT

The present invention relates to a radar device and, particularly, to a radar device mounted on a vehicle to be used for a collision alarm and the like. The invention provides a radar device that has a unit for removing the FMAM noise without lowering the signal detection sensitivity. The radar device transmits a frequency modulation signal by switching the frequency modulation signal with a first switching signal, receives a signal reflected from a target object, switches the reception signal with a second switching signal, mixes the switched reception signal with the transmission signal, and further mixes the mixed signals with a third switching signal thereby to obtain a beat signal. The radar device obtains a distance to the target object and a relative speed of the target object from the beat signal. The second switching signal and the third switching signal have the same switching frequency, and have a predetermined phase difference between the phases of the two switching signals to cancel and remove an amplitude modulation component included in the frequency modulation signal.

17 Claims, 8 Drawing Sheets

RADAR DEVICE

This application claims priority to Japanese Patent Application No. 2001-375892 filed on Dec. 10, 2001.

BACKGROUND OF THE INVENTION

1. Field of the Invention

The present invention relates to a radar device. The invention particularly relates to a radar device mounted on a vehicle to be used for a collision alarm, for collision prevention, for auto-cruise control, and for automatic driving.

2. Description of the Related Art

Among radar devices that measure a relative speed between a vehicle and a target object or a distance between the vehicles, there are radar devices that employ various kinds of radar systems such as an FM-CW (Frequency Modulated-Continuous Waves) radar and a pulse Doppler radar. Particularly, the FM-CW radar device has advantages in that it has a relatively compact circuit structure and low cost, and that it is possible to obtain a distance between moving units such as vehicles and a relative speed between the vehicles at the same time. Therefore, this FM-CW radar device is currently employed in many vehicles.

FIG. 1 shows one example of a conventional FM-CW radar device.

In FIG. 1, a millimeter-wave signal generated by a voltage control oscillator (VCO) 3 is FM-modulated based on an FM signal from a modulation signal generating section 6. A triangular wave signal is generally used as the modulation signal. A triangular-wave FM-modulated transmission signal is emitted from a transmission antenna 1 to a forward moving unit such as a vehicle. A reception antenna 2 receives a reflection signal from the forward moving unit. An RF mixer 4 mixes the reception signal and a part of the transmission signal, and outputs a beat signal. A signal processing section 7 obtains a distance between the forward moving unit and the own vehicle and a relative speed between the two vehicles, by using frequency information included in the beat signal.

When a frequency of the transmission signal generated by the voltage control oscillator 3 is $f_0$ and when a beat frequency of transmission/reception signals is $f_8$, a frequency of the reception signal received by the reception antenna 2 is expressed as $f_0+f_8$. The RF mixer 4 mixes the reception signal of the frequency $f_0+f_8$ and the transmission signal of the frequency $f_0$, and outputs a beat signal having the frequency $f_8$ as a differential signal between the two signals.

A signal level of the signal from the voltage control oscillator 3 has a predetermined frequency characteristic within a range of the output frequency, and it is difficult to make the transmission power-frequency characteristic completely flat in the total transmission system.

FIG. 2 shows one example of variations in output signal levels $d_0$ to $d_1$ of the voltage control oscillator 3 within an output frequency range from $f_0$ to $f_1$. In this example, an output signal frequency is swept repetitively from $f_0$ to $f_1$ and from $f_1$ to $f_0$ based on a triangular wave base-band signal from the modulation signal generating section 6. During this period, an output signal level also changes repetitively from $d_0$ to $d_1$ and from $d_1$ to $d_0$.

As a result, a transmission signal is AM modulated in synchronism with an FM modulation timing according to the triangular wave base-band signal as a modulation signal. When the RF mixer 4 uses a part of the transmission signal as a local signal, the RF mixer 4 generates noise of a low frequency area that includes noise due to the AM modulation, in the output of the RF mixer 4 according to its AM demodulation function. This noise component will hereinafter be referred to as "FMAM noise".

A high-pass filter (HPF) 5, as shown in FIG. 1, is inserted in a beat signal processing system in order to remove this FMAM noise component. In place of this high-pass filter 5, a band-pass filter or the like may be used.

However, when the high-pass filter 5 is used according to the conventional practice, a signal component (a short-distance beat signal component) existing in the low frequency area in which the FMAM noise also exists, is attenuated at the same time. Therefore, there has been a problem that the signal detection sensitivity in the low frequency area is lowered. There has also been a possibility that when an FMAM noise level changes due to temperature and other factors, this change of the noise level is erroneously detected as a signal.

SUMMARY OF THE INVENTION

In the light of the above problems, it is an object of the present invention to provide a radar device that has a unit for removing the FMAM noise without lowering the signal detection sensitivity.

It is another object of the present invention to provide a radar device that can obtain satisfactory signal detection sensitivity within a range from a short distance to a long distance by suitably controlling the FMAM-noise removing unit.

According to one aspect of the present invention, there is provided a radar device that transmits a frequency modulation signal by switching the frequency modulation signal using a first switching signal, receives a signal reflected from a target object, switches the reception signal using a second switching signal, mixes the switched reception signal with the transmission signal, and further mixes the mixed signals using a third switching signal thereby to obtain a beat signal. The radar device obtains a distance from the target object and a relative speed of the target object from the beat signal. The second switching signal and the third switching signal have the same switching frequency, and have a predetermined phase difference between the phases of the two switching signals to cancel and remove an amplitude modulation component included in the frequency modulation signal. The predetermined phase difference is substantially 90 degrees. Based on this, it is possible to obtain a target radar device that lowers the FMAM noise.

According to another aspect of the invention, the ON time of the second switching signal is at least two times the time from when a transmission wave is transmitted and reflected from the target object located at a maximum detection distance till when this reflected wave returns to the transmission origin. Based on this, it is possible to carry out a design that makes it possible to detect up to the maximum detection distance. Within this range, it is possible to set both the ON time of the first switching signal and the ON time of the second switching signal, or the ON time of the first switching signal or the ON time of the second switching signal, shorter than the time required for a detection distance. Further, it is possible to change the frequencies of the first, second and third switching signals corresponding to the detection distance respectively.

For example, at the time of measuring a short-distance signal, it is possible to set the ON time of the first switching signal shorter than the ON time of the second switching signal, from the viewpoint of the transmission signal (refer to FIG. 8 to be explained later). On the other hand, from the viewpoint of the reception signal, it is possible to set the ON time of the second switching signal shorter than the ON time of the first switching signal. In both cases, it is possible to improve the reception level by increasing the frequencies of the first and second switching signals.

In order to simplify the circuit, the first switching signal and the second switching signal have the same switching frequency, and these switching signals are switched on in mutually opposite phases. These switching signals are rectangular waves having a 50% duty ratio. Further, with a view to improving the cancellation rate of the FMAM noise, the first, second and third switching signals are generated in the same oscillation source, in order to maintain accurate synchronization and an accurate phase difference. Further, there is provided a unit for adjusting a delay between the first, second and third switching signals respectively.

According to still another aspect of the present invention, there is provided a phase variable unit that can change a phase difference between the phase of the second switching signal and the phase of the third switching signal. The phase difference is changed to either 0 degree or 90 degrees. With this arrangement, it is possible to carry out a long-distance measuring based on a phase difference of 0 degree and a short-distance measuring based on a phase difference of 90 degrees, substantially at the same time. This changeover is carried out at each half period or at each integer times one period of the frequency modulation signal. This period corresponds to a measuring operation period of the FM-CW radar, and has an advantage in that this facilitates the signal processing.

Further, the radar device has a comparing and detecting unit that compares measurement information based on a phase difference of 0 degree or a phase difference of 90 degrees according to the phase variable unit, and detects in high precision a distance from the target object and a relative speed. The comparing and detecting unit uses spectrum information of a beat signal as the measurement information based on a phase difference of 0 degree or a phase difference of 90 degrees, and corrects one spectrum information based on the other spectrum information. Based on this, it becomes possible to carry out an accurate extraction of a beat signal at a short distance close to the FMAM noise, and a fault diagnosis and a correction of noise filter characteristics at a short distance or a long distance.

Further, the phase variable unit may be composed of a plurality of mixing systems that use a plurality of the third switching signals having mutually different phase differences between the third switching signals and the second switching signal respectively. Based on this, it becomes possible to carry out both a short-distance measuring and a long-distance measuring at the same time. In actual practice, a digital signal processor (DSP) or a microprocessor unit (MPU) carries out a signal processing to execute the processing of the mixing systems. One of the mixing systems is selected in sequence to carry out the processing.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 1:
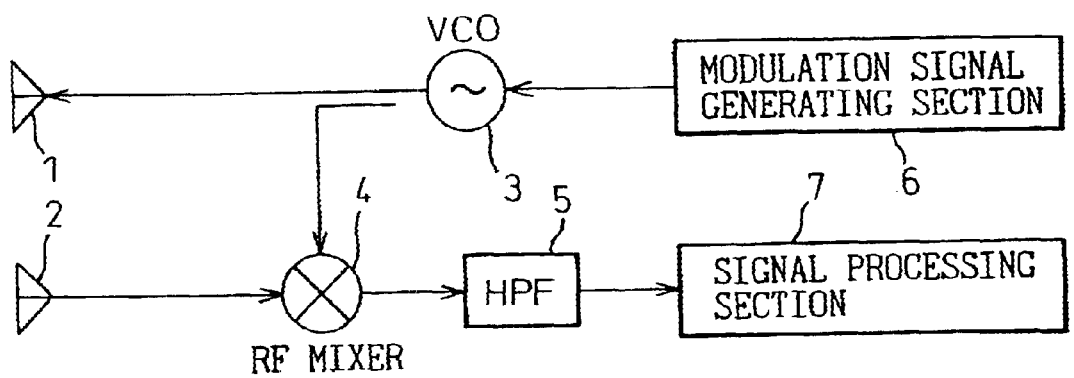
FIG. 1 is a diagram that shows one example of a conventional FM-CW radar device.
Figure 2:
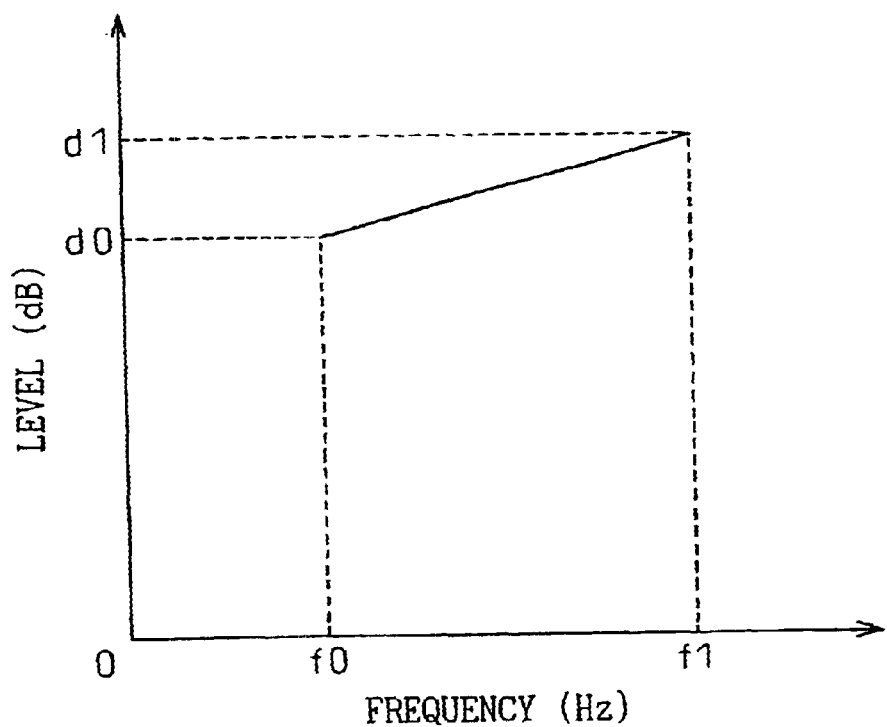
FIG. 2 is a diagram that shows one example of variations in output signal levels of a voltage control oscillator within an output frequency range.
Figure 3:
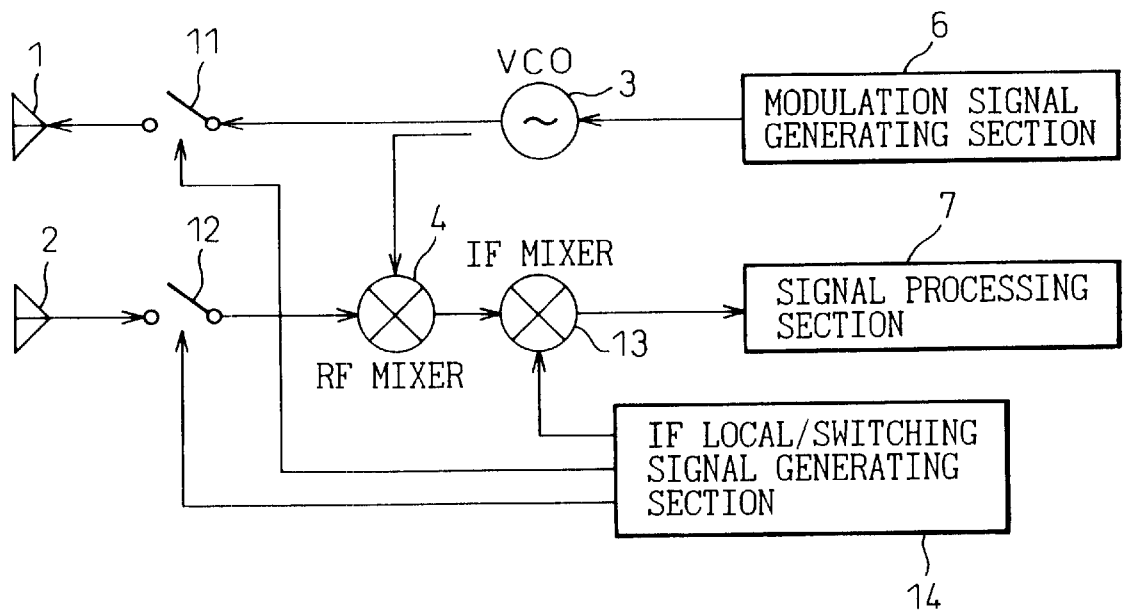
FIG. 3 is a diagram that shows a basic structure of a radar device according to the present invention.

FIG. 3 shows a basic structure of a radar device according to the present invention. In FIG. 3, constituent elements identical with those in FIG. 1 are attached with the same reference numbers, and they will not be explained in further detail.

Switches 11 and 12 are opened or closed according to a driving signal from an IF local/switching signal generating section 14. These switches 11 and 12 are provided to share a transmission/reception antenna, and to prevent degradation of a signal-to-noise ratio due to a leakage to a reception antenna 2 of a triangular-wave FM signal that is output from a transmission antenna 1. To facilitate the understanding of the operation of the invention, a transmission antenna 1 and the reception antenna 2 are separated in FIG. 3.

The switch 12 at the reception side switches a signal received by the reception antenna 2. An RF mixer 4 converts this switched signal into an IF signal having a frequency $f_{sw} \pm f_\delta$ (a signal obtained by dividing the switched signal by a frequency $f_{sw}$) by mixing. A local mixing signal that is input to the RF mixer 4 includes an FMAM noise component, and this FMAM noise component is also output to the output end of the RF mixer 4.

An IF mixer 13 has a switching frequency $f_{sw}$ that is the same as the switching frequency of the driving signal of the switch 11 or 12. The IF mixer 13 carries out mixing processing by using a separate driving signal that keeps a constant phase difference of about 90 degrees in principle from the phase of the above driving signal. As a result, the output signal of the IF mixer 13 is converted into a baseband signal, and the FMAM noise component is removed, so that only a desired beat signal of a frequency $f_\delta$ is output, as explained later. Therefore, the conventional high-pass filter 5 or a band-pass filter is not necessary in the present embodiment.

Figure 4:
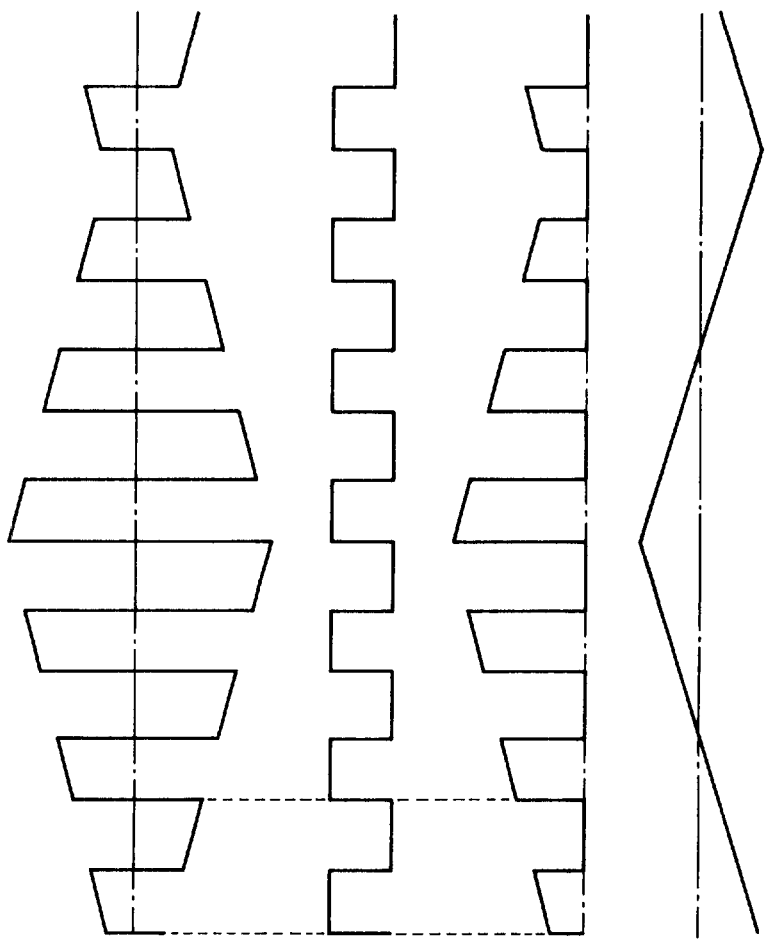
FIG. 4 is diagram that shows the principle of operation when a phase difference is 0 degree.
Figure 5:
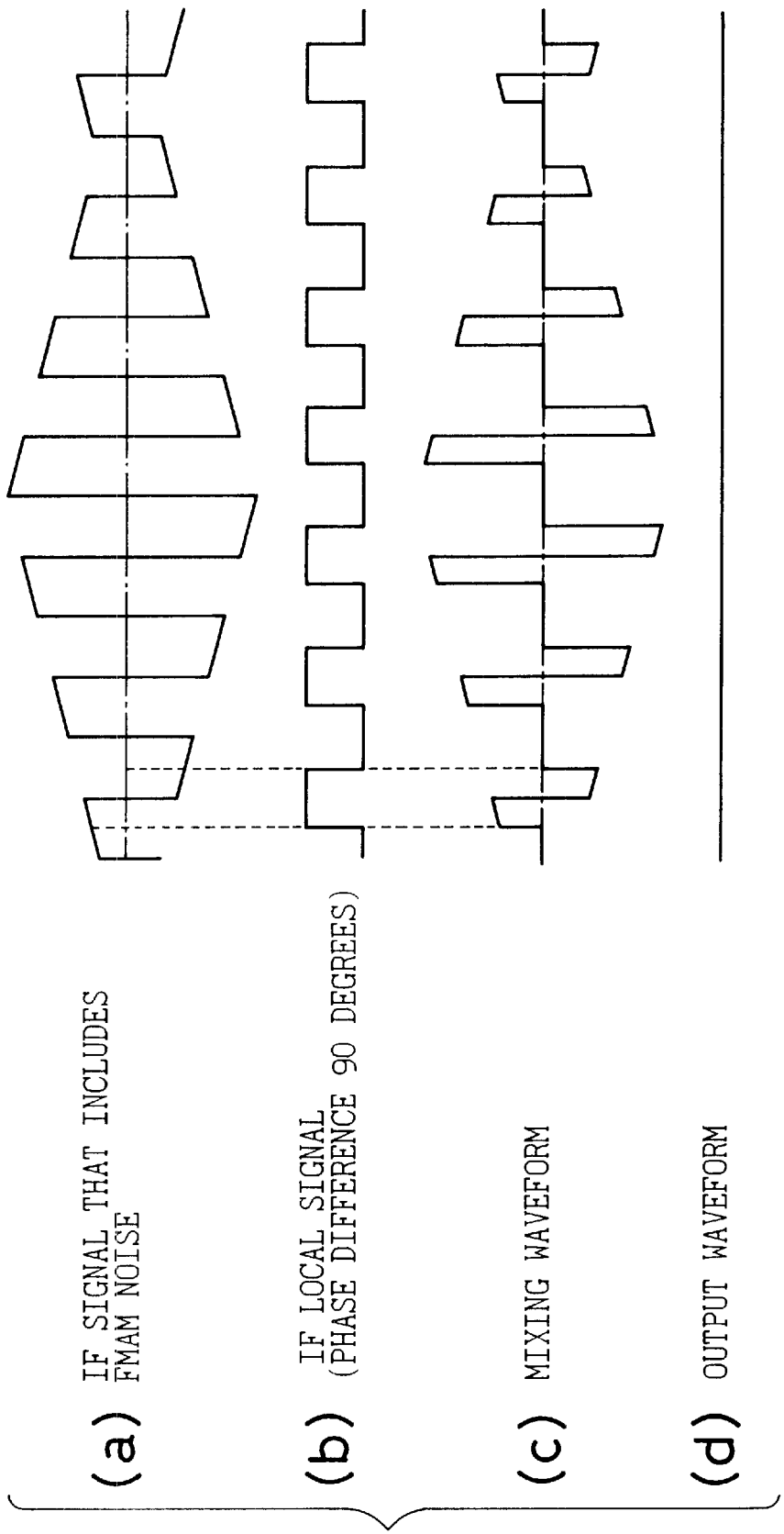
FIG. 5 is diagram that shows the principle of operation when a phase difference is 90 degrees.

FIG. 4 and FIG. 5 show the principle of operation of the IF mixer 13 that removes the FMAM noise component from the IF signal. In FIG. 4, (a) to (d) show a case where a phase difference between the phase of the switch 11 or 12 and the phase of the IF mixer 13 is 0 degree. In FIG. 5, (a) to (d) show a case where a phase difference between the phase of the switch 11 or 12 and the phase of the IF mixer 13 is 90 degrees.

When the phase difference is 0 degree, (a) in FIG. 4 shows one example of the IF signal that includes the FMAM noise that is input to the IF mixer 13. (b) shows the driving signal of the IF mixer 13 that has the same phase (a phase difference 0) as the phase of the driving signal of the switch 11 or 12. In this case, only one half-wave component of the IF signal is extracted by the mixing as shown in (c). As a result, the base-band signal after the frequency conversion still includes the FMAM noise component that is demodulated as it is, as shown in (d).

On the other hand, when the phase difference is 90 degrees in FIG. 5, the IF signal shown in (a) is the same as that shown in (a) of FIG. 4. (B) shows the driving signal of the IF mixer 13 that has a phase difference of 90 degrees from the phase of the driving signal of the switch 11 or 12. In this case, an equivalent wave component that mutually cancels the FMAM noise component superimposed on the IF signal is extracted by mixing, as shown in (C). As a result, the base-band signal after the frequency conversion has all the FMAM noise component removed, as shown in (D).

Figure 6:
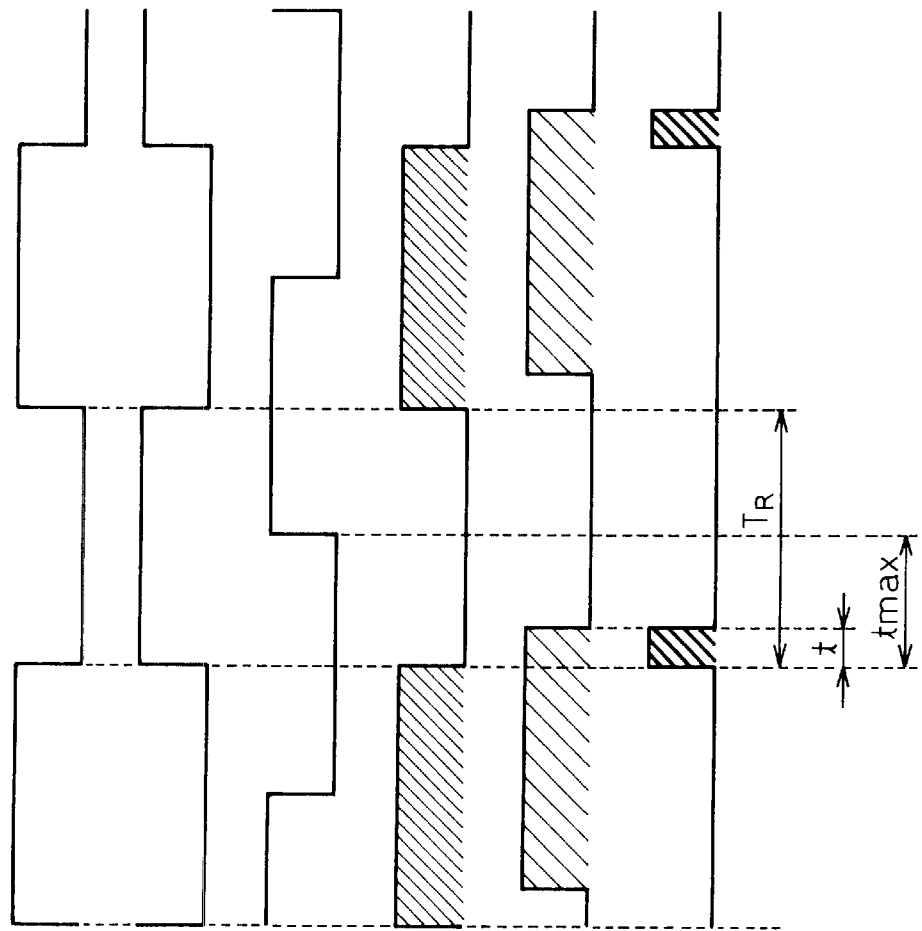
FIG. 6 is diagram that shows a relationship between an ON time of a switch at a reception side and a detecting time of a reception signal in the example shown in FIG. 3.

FIG. 6 shows a relationship between an ON time of the switch at the reception side and a detecting time of a reception signal in the example shown in FIG. 3.

In FIG. 6, a transmission signal indicated by a meshed portion in (d) is transmitted during the ON time of the transmission switch 11 shown in (a). A part of a reflection signal shown in (e) of the transmission signal is detected as a reception signal as shown in (f) during the ON time of the reception switch 12 shown in (b).

A time t from when a transmission signal is transmitted until the transmission signal returns after a reflection from a target object is expressed as t=2R/C, where R represents a one-way distance from the transmission origin to the target object, and C represents the speed of light. Based on the principle similar to that explained in FIGS. 4 and 5, when a detection time (that is, the time t) of the reception signal exceeds one half of an ON time $T_R$ of the reception switch (a phase of 90 degrees), a total reception signal level is lowered due to the cancellation effect of the signal that is received after the time $T_R/2$. As a result, the reception level becomes zero at the time t=$T_R$.

Therefore, when a maximum detection time is set as tmax=$T_R/2$ in order to maintain high detection precision of a reception signal, the reception switch ON time $T_R$ needs to be at least two times the maximum detection time tmax. This is expressed as $T_R \geq 2$ tmax. Based on this, a clock frequency of the driving signal of the switches 11 and 12 and the driving signal of the IF mixer respectively becomes $f_{sw} \leq \frac{1}{2}$ TR, and a maximum detection distance that can be detected by the radar becomes Rmax$\leq$C tmax/2.

Figure 7:
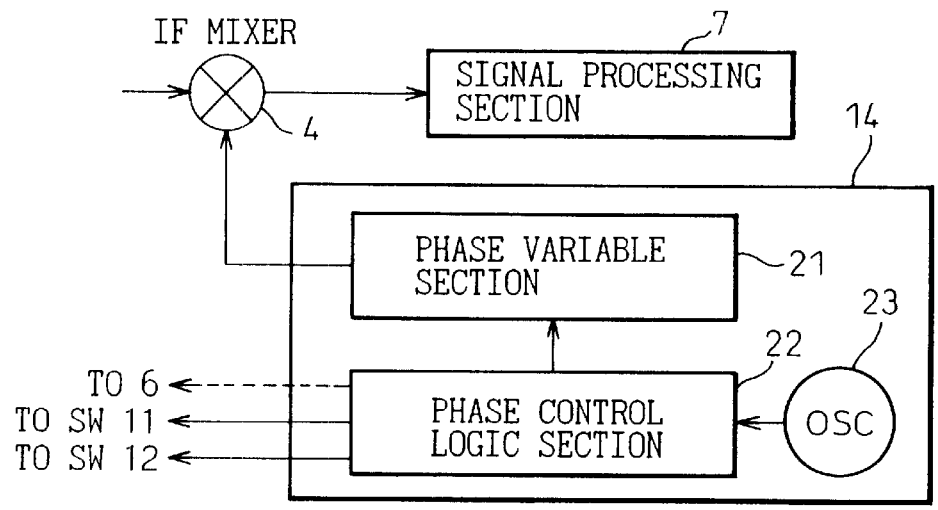
FIG. 7 is a diagram that shows one example of a structure of an IF local/switching signal generating section.

FIG. 7 shows one example of a structure of the IF local/switching signal generating section 14.

In FIG. 7, a common oscillator (OSC) 23 is used as an oscillation source that generates both the driving signal of the switches 11 and 12 and the driving signal of the IF mixer 4. Based on this, it is possible to easily realize a phase synchronization of the driving signals. A phase control logic section 22 is constructed of a logic circuit or software. The logic circuit generates and outputs a driving signal of the switches 11 and 12, and frequency-divides a reference clock signal from the oscillator 23 with a counter thereby to prepare various kinds of timing signals. The software makes a microprocessor prepare various kinds of timing signals based on the reference clock signal.

A phase variable section 21 generates and outputs a driving signal of the IF mixer 4 that can change the phase by using a logic circuit or software similar to that explained above or by using a PLL circuit, based on a timing signal prepared by the phase control logic section 22. As an example of the most simple and practical method for this, a phase difference between the phase of the driving signal of the switches 11 and 12 and the phase of the driving signal of the IF mixer is changed over between 0 degree and 90 degrees. The phase difference is changed over to 90 degrees for a short-distance measuring, thereby to make it possible to achieve high-precision measuring by eliminating the influence of the FMAM noise at a short distance. The phase difference is changed over to 0 degree for a long-distance measuring, thereby to make it possible to expand a measurable long distance that has no influence of the FMAM noise.

Figure 8:
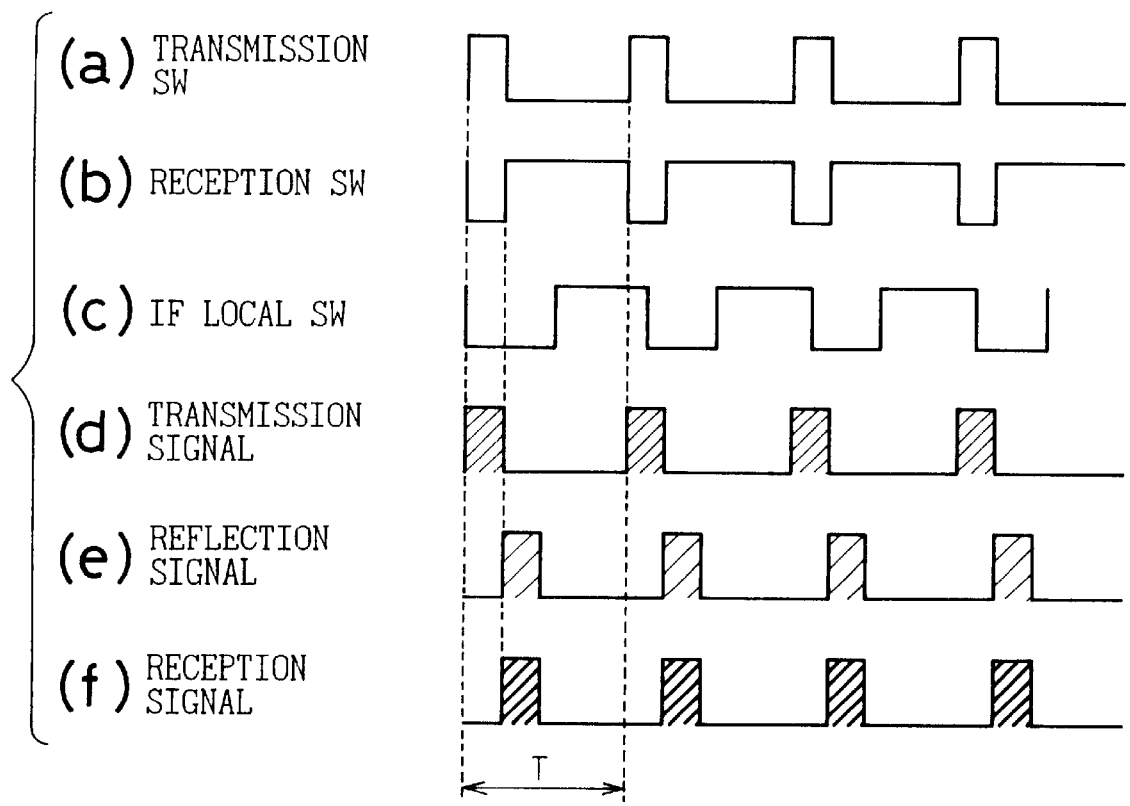
FIG. 8 is diagram that shows one embodiment of a short-distance measuring that uses the structure shown in FIG. 7.

FIG. 8 shows one embodiment of a short-distance measuring that uses the structure shown in FIG. 7.

In an example of FIG. 8, the phase control logic section 22 generates a driving signal of the transmission/reception switches for other than duty 50%, as shown in (a) and (b). As shown in (d) to (f) of FIG. 6, the received signal is only a part of the last end of the transmission signal corresponding to a distance from the measured object.

Therefore, it is not necessary to transmit the transmission signal during the whole transmission period of the duty 50% as shown in (d) of FIG. 6. It is possible to obtain the same effect by transmitting the transmission signal by only a length that is necessary for the measurement, as shown in (d) to (f) of FIG. 8. With this arrangement, in the present embodiment, the driving signal frequency $f_{sw}$ (=1/T) of the transmission/reception switches is set higher by the portion corresponding to the reduction in the transmission time, thereby to increase the reception power. From the viewpoint of only increasing the reception power, it is possible to set the ON time of the transmission/reception switches to a timing at which the ON times are mutually superimposed.

Figure 9:
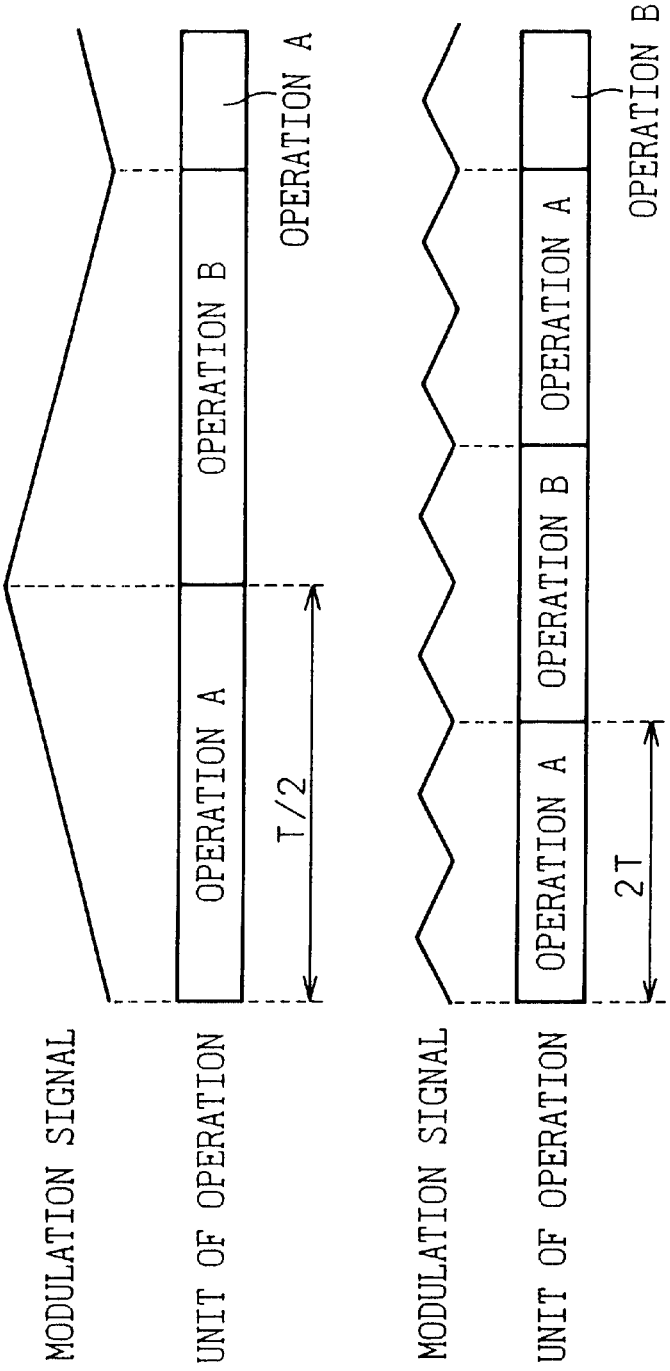
FIG. 9A is a diagram that shows another embodiment of a distance measuring that uses the structure shown in FIG. 7.
FIG. 9B is a diagram that shows still another embodiment of a distance measuring that uses the structure shown in FIG. 7.

FIGS. 9A and 9B show other embodiments of a distance measuring that use the structure shown in FIG. 7 respectively.

In these embodiments, the phase control logic section 22 supplies an FM frequency modulation signal to the modulation signal generating section 6. In synchronism with this, the phase variable section 21 alternately changes over the phase difference to between 0 degree and 90 degrees at each half period (T/2) or at each integer times one period (nT, where n is an integer) of the FM frequency modulation signal.

FIG. 9A shows the embodiment for distance measuring when the phase variable section 21 alternately changes over the phase difference to between 0 degree and 90 degrees at each half period. FIG. 9B shows the embodiment for distance measuring when the phase variable section 21 alternately changes over the phase difference to between 0 degree and 90 degrees at each two periods. Operation A shows a short-distance measuring operation when the phase difference is 90 degrees, and operation B shows a measuring operation of a long distance when the phase difference is 0 degree. A relative speed is obtained for each half period of an up period or a down period of FM modulation. Therefore, in the present embodiments, a half period is used as a minimum period of the operation. Based on this method, it is possible to measure both a short distance and a long distance substantially at the same time.

Based on the above embodiments, it is possible to compare the spectrum information of the short distance and that of the long distance with each other. It is possible to correct a result of one measurement based on a result of the other measurement. It is also possible to detect an error in a result of one measurement based on a result of the other measurement. As a result, it is possible to increase the reliability of the measuring results.

If, in one measurement, a reception signal having a level near a detection threshold value is received during an up period of FM modulation, and this reception signal is not received during a down period due to the attenuation of a certain filtering characteristic, then, in the other measurement, the reception signal is received during both an up period and a down period. In this case, it is possible to correct the reception level during the down period in the one measurement, by using the result obtained in the other measurement. When a result after the correction exceeds a detection threshold value, it is decided that the reception signal has been normally received. As a result, it is possible to avoid an erroneous detection.

Figure 10:
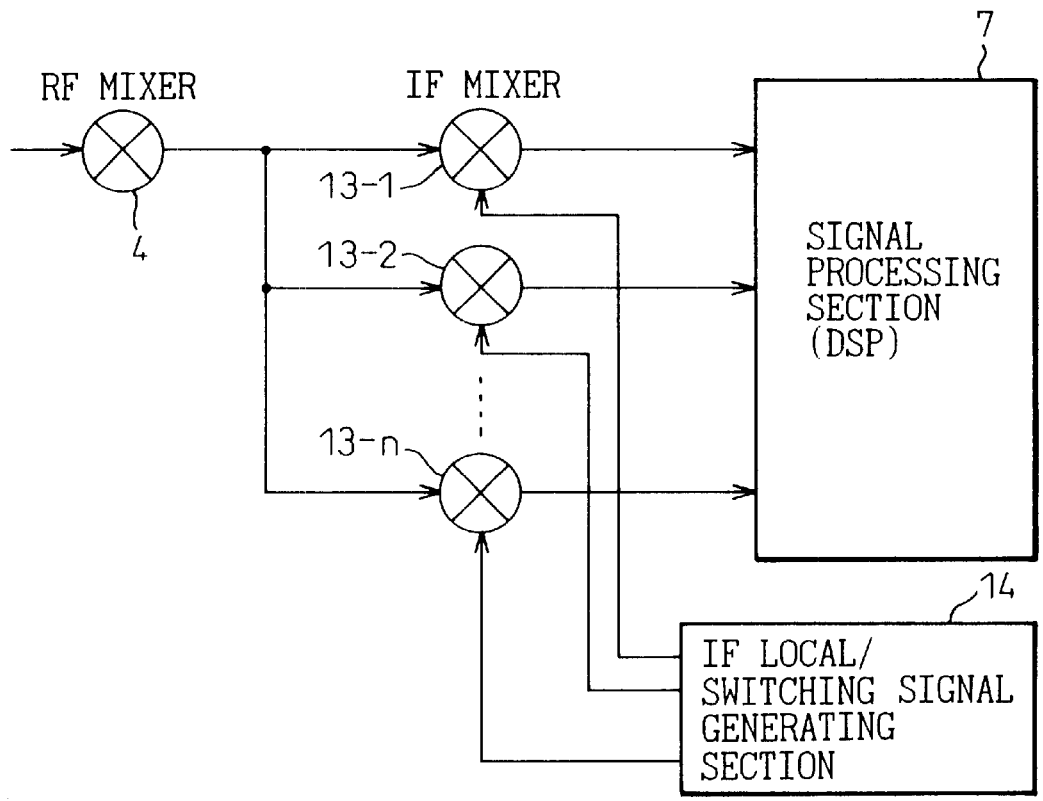
FIG. 10 is a diagram that shows a modification of the structure shown in FIG. 3.
Figure 11:
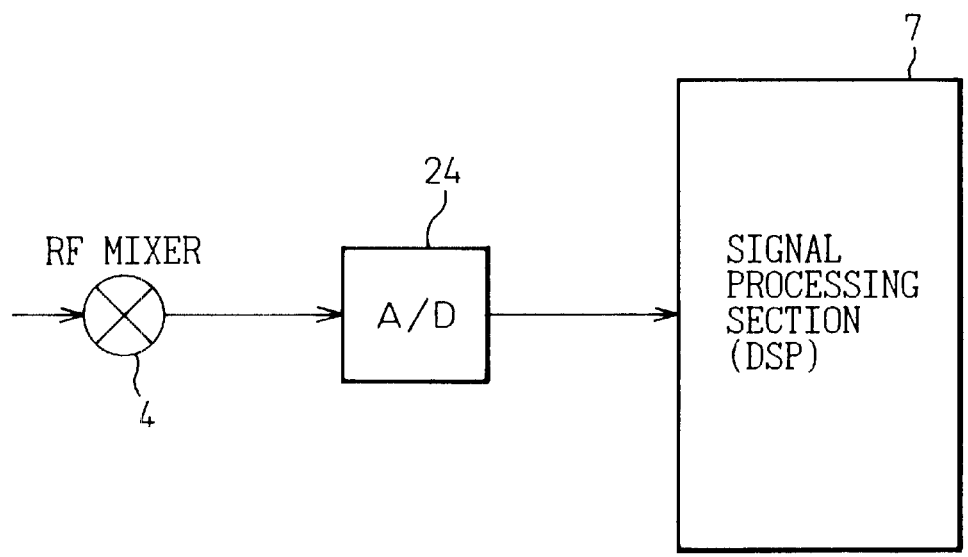
FIG. 11 is a diagram that shows another modification of the structure shown in FIG. 3.

FIG. 10 and FIG. 11 show modifications of the structure shown in FIG. 3 respectively.

In FIG. 10, a plurality of IF mixers 13-1 to 13-n are provided. The IF local/switching signal generating section 14 supplies driving signals of these IF mixers having mutually different phase differences to these IF mixers 13-1 to 13-n respectively. Therefore, in the present modification, the phase control logic section 22 generates and outputs the driving signals of the IF mixers having a plurality of fixed phase differences. Consequently, the phase variable section 21 is not necessary. The IF mixers 13-1 to 13-n simultaneously process IF signals from the RF mixer 4 based on the phase differences of the IF mixers 13-1 to 13-n respectively. A signal processing section 7 consisting of an AD converter or a DSP executes a signal processing based on a measured distance corresponding to each phase difference.

FIG. 11 shows another modification of the structure shown in FIG. 3 that executes the same functional operation as that shown in FIG. 10.

In FIG. 11, an A/D converter 24 directly converts IF signals from the RF mixer 4 into digital signals. A DSP within the signal processing section 7 executes the functions corresponding to the IF mixers 13-1 to 13-n and the IF local/switching signal generating section 14 in FIG. 10, based on software. It is possible to easily achieve this processing, based on highly advanced functions and high-speed processing of the DSP realized in recent years.

As explained above, according to the present invention, it is possible to provide a radar device that has a unit for removing the FMAM noise without lowering the signal detection sensitivity. Further, according to the present invention, it is possible to obtain satisfactory signal detection sensitivity within a range from a short distance to a long distance by suitably controlling the FMAM-noise removing unit.

What is claimed is:

1. A radar device that transmits a frequency modulation signal by switching the frequency modulation signal with a first switching signal, receives a signal reflected from a target object, switches the reception signal with a second switching signal, mixes the switched reception signal with the transmission signal, further mixes the mixed signal with a third switching signal thereby to obtain a beat signal, and obtains a distance from the target object and a relative speed between the self and the target object from the beat signal, wherein the first or second switching signal and the third switching signal have the same switching period or frequency, and have a predetermined deviation of a switching starting time or a predetermined phase difference between the phase of the first or second switching signal and the phase of the third switching signal.

2. The radar device according to claim 1, wherein the predetermined phase difference is substantially 90 degrees, or the predetermined switching starting time is a half of the switching ON time.

3. The radar device according to claim 1, wherein the ON time of the second switching signal is at least two times the time from when a transmission wave is transmitted and reflected from the target object located at a maximum detection distance until this reflected wave returns to the transmission origin.

4. The radar device according to claim 1, wherein both the ON time of the first switching signal and the ON time of the second switching signal, or the ON time of the first switching signal or the ON time of the second switching signal is set variable according to a detection distance.

5. The radar device according to claim 1, wherein the radar device changes the frequencies of the first, second and third switching signals corresponding to a detection distance respectively.

6. The radar device according to claim 1, wherein the first switching signal and the second switching signal have the same switching frequency and are switched ON in mutually opposite phases, and have a 50% duty ratio.

7. The radar device according to claim 1, wherein the first, second and third switching signals are rectangular waves.

8. The radar device according to claim 1, wherein the first, second and third switching signals are generated in the same oscillation source.

9. The radar device according to claim 8, further comprising a unit for adjusting a delay between the first, second and third switching signals respectively.

10. The radar device according to claim 1, further comprising a phase variable unit that can change a phase difference between the phase of the second switching signal and the phase of the third switching signal.

11. The radar device according to claim 10, wherein the phase variable unit changes over the phase to either 0 degree or 90 degrees.

12. The radar device according to claim 11, wherein the changeover is carried out at each half period or at each integer times one period of the frequency modulation signal.

13. The radar device according to claim 11, further comprising a comparing and detecting unit that compares measurement information based on a phase difference of 0 degree or a phase difference of 90 degrees according to the phase variable unit, and detects in high precision a distance from the target object and a relative speed.

14. The radar device according to claim 13, wherein the comparing and detecting unit uses spectrum information of a beat signal as the measurement information based on a phase difference of 0 degree or a phase difference of 90 degrees, and corrects one spectrum information based on the other spectrum information.

15. The radar device according to claim 10, wherein the phase variable unit is composed of a plurality of mixing systems that use a plurality of the third switching signals having mutually different phase differences between the third switching signals and the second switching signal respectively.

16. The radar device according to claim 15, wherein the phase variable unit further comprises a switching unit for selectively using one of the plurality of mixing systems.

17. The radar device according to claim 15, wherein a signal processor carries out the processing of the plurality of mixing systems.

* * * * *

UNITED STATES PATENT AND TRADEMARK OFFICE
CERTIFICATE OF CORRECTION

| | |
|---|---|
| PATENT NO. | : 6,664,919 B2 |
| APPLICATION NO. | : 10/313149 |
| DATED | : December 16, 2003 |
| INVENTOR(S) | : Isaji |

Page 1 of 1

It is certified that error appears in the above-identified patent and that said Letters Patent is hereby corrected as shown below:

At claim 1, column 7, line 59, please replace "signal" with --signals--

Signed and Sealed this

Fourth Day of December, 2007

JON W. DUDAS
*Director of the United States Patent and Trademark Office*